(12) United States Patent
Jacobs et al.

(10) Patent No.: US 9,828,264 B2
(45) Date of Patent: Nov. 28, 2017

(54) HYDROGEN SULFIDE ABATEMENT IN GEOTHERMAL FACILITIES

(71) Applicant: Ecolab USA Inc., Naperville, IL (US)

(72) Inventors: Gregory Jacobs, Murrieta, CA (US); Henry Castanieto, San Diego, CA (US); Steven J. Butler, Julian, CA (US); John L. Featherstone, El Centro, CA (US)

(73) Assignee: ECOLAB USA INC., Naperville, IL (US)

( * ) Notice: Subject to any disclaimer, the term of this patent is extended or adjusted under 35 U.S.C. 154(b) by 259 days.

(21) Appl. No.: 14/338,985

(22) Filed: Jul. 23, 2014

(65) Prior Publication Data

US 2016/0023927 A1 Jan. 28, 2016

(51) Int. Cl.

| | |
|---|---|
| *B01D 53/52* | (2006.01) |
| *B01D 53/00* | (2006.01) |
| *B01D 53/78* | (2006.01) |
| *C02F 1/72* | (2006.01) |
| *C02F 1/76* | (2006.01) |
| *C02F 1/78* | (2006.01) |
| *C02F 101/10* | (2006.01) |
| *C02F 103/06* | (2006.01) |

(52) U.S. Cl.
CPC ............... *C02F 1/722* (2013.01); *B01D 53/52* (2013.01); *B01D 53/78* (2013.01); *B01D 53/002* (2013.01); *B01D 2251/10* (2013.01); *B01D 2251/104* (2013.01); *B01D 2251/106* (2013.01); *B01D 2251/108* (2013.01); *B01D 2251/11* (2013.01); *C02F 1/76* (2013.01); *C02F 1/766* (2013.01); *C02F 1/78* (2013.01); *C02F 2101/101* (2013.01); *C02F 2103/06* (2013.01)

(58) Field of Classification Search
None
See application file for complete search history.

(56) References Cited

U.S. PATENT DOCUMENTS

| | | | |
|---|---|---|---|
| 5,364,439 A | * | 11/1994 | Gallup ................. B01D 53/002 423/210 |
| 5,589,507 A | * | 12/1996 | Hall, II .................. A01N 37/02 422/12 |
| 8,303,768 B2 | | 11/2012 | Shevchenko et al. |
| 2013/0161265 A1 | | 6/2013 | Fox et al. |
| 2013/0233796 A1 | | 9/2013 | Rao et al. |
| 2013/0233804 A1 | | 9/2013 | Xie et al. |

OTHER PUBLICATIONS

Nagl, Gary J., "Controlling $H_2S$ emissions in geothermal power plants", Bulletin d'Hydrogeologie No. 17 (1999) pp. 393-402.

* cited by examiner

*Primary Examiner* — Daniel Berns
(74) *Attorney, Agent, or Firm* — Eric D. Babych; Brinks Gilson & Lione

(57) ABSTRACT

A method of reducing hydrogen sulfide content in a medium is disclosed. The method may include the steps of contacting a medium containing hydrogen sulfide with an effective amount of hydrogen peroxide, contacting the medium with an oxidizing agent, converting the hydrogen sulfide to sulfate, and reducing the hydrogen sulfide content in the medium. The medium may be a gas or a liquid.

10 Claims, 1 Drawing Sheet

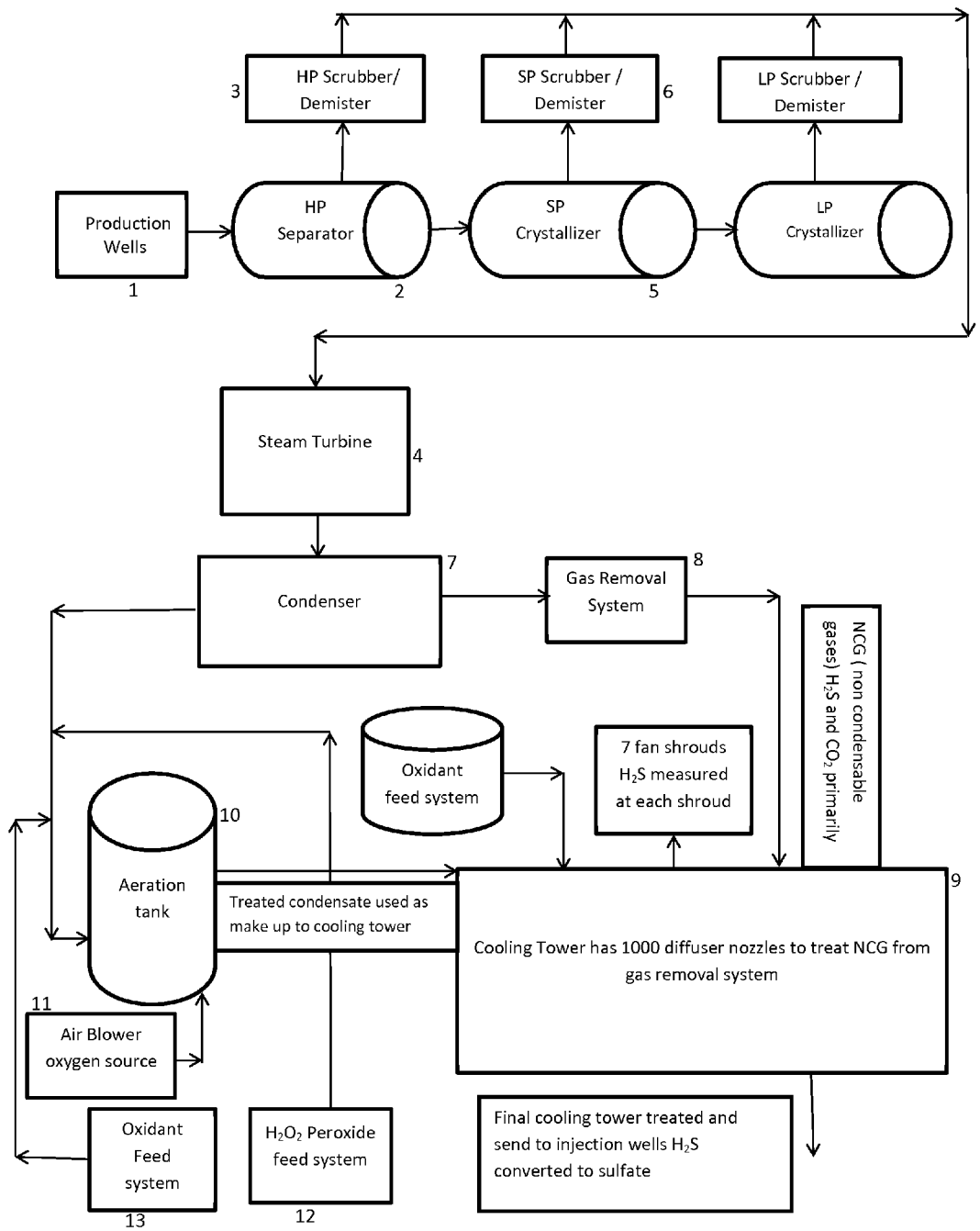

HYDROGEN SULFIDE ABATEMENT IN GEOTHERMAL FACILITIES

BACKGROUND

1. Field of the Invention

The present disclosure generally relates to geothermal power plants. More particularly, the disclosure relates to hydrogen sulfide abatement in geothermal facilities.

2. Description of the Related Art

Geothermal energy is energy in the form of heat within the earth's interior, which is tapped by geothermal wells. Since the earth's interior is extremely hot, there is an enormous potential energy supply in this heat, but there are many technical and economic challenges in optimizing the tapping of this energy source. The use of geothermal energy as a renewable energy source, nonetheless, has gained in importance as other energy sources become less abundant and more expensive. It produces one of the lowest carbon emissions, depending on the resource.

Geothermal energy moves towards the earth's surface by thermal conduction through solid rock. Thermal energy can also be transmitted towards the earth's surface by movement of molten rock or by circulation of fluid ($H_2O$ as steam or water) through interconnected fractures and pores, which may provide heat reservoirs closer to the surface and thus a site more accessible to drilling for wells to tap geothermal energy.

Natural geothermal reservoirs, on which many commercial geothermal wells are located, comprise volumes of rock at high temperatures (up to about 350° C. or 622° F.) and often also of high porosity and high permeability to fluids. Wells are drilled into such a reservoir and the thermal energy in the rock is transferred by conduction to a fluid ($H_2O$ as water or steam), which subsequently flows to the well and then up to the earth's surface. In areas where the rock has a low porosity and permeability, it must be artificially fractured by means of explosives or hydrofracturing to provide a network of such fractures, commonly known as Enhanced Geothermal Systems (EGS).

The thermal fluid within the fractures and pores of a reservoir may be almost entirely in a liquid state, which liquid state exists at temperatures much higher than the boiling point of water at atmospheric pressure because of the high pressure of overlying water. Such a reservoir is referred to as a liquid-dominated, or water-dominated, reservoir. When the thermal fluid within larger fractures and pores is in the form of steam, the reservoir is referred to as a vapor-dominated reservoir, commonly known as Gysers. A liquid-dominated reservoir may produce either water or a mixture of water and steam. A vapor-dominated reservoir routinely produces only steam, and in most instances the produced steam is super-heated steam.

In the geothermal production of electricity from a water-dominated reservoir, the pressurized hot water produced from a well is flashed to a lower pressure at the earth's surface, converting the water partly to steam, and this steam is used to drive a conventional turbine-generator set. In a relatively rare vapor-dominated reservoir, the superheated steam may be piped directly to the turbine without the separation of water.

Many geothermal wells for the production of electricity are water-dominated hydrothermal convection systems characterized by the circulation of surface water, including wastewaters and/or condensates, downhole. The driving force of the convection systems is gravity, the cold downward-moving recharge water being much denser than the heated, upward-moving thermal water. The technique of reinjection of wastewaters or condensates back into the wells may be used for a number of reasons, including avoidance of surface disposal of such waters which may contain pollutants. Selective injection or reinjection of water into the thermal system may help to retain aquifer pressures and to extract more geothermal energy from the rock than is possible when fresh geothermal water is itself the main produced fluid. The produced fluid is either magmatic (released from solidifying magma), meteoric (rain and snow), or a mixture of the two, and may be fresh, reinjected, or a mixture of the two.

Geothermal steam is generally used as the energy source, regardless of whether the produced fluid is steam, partly steam, or water that is partly converted to steam flash evaporation. Geothermal steam is used in power generation as well as heating and electrical processes. Geothermal steam temperatures range from about 185° C. to about 370° C. (about 365° F. to about 700° F.), have a salinity from less than 1000 ppm up to several hundred thousand ppm, and a content of non-condensable gases (NCG) up to about 6 percent.

While geothermal power plants remain attractive from an environmental stand point, geothermal steam contains components that must be addressed. For example, geothermal steam contains NCG, such as hydrogen sulfide ($H_2S$) and carbon dioxide ($CO_2$). Hydrogen sulfide exists as a gas and as a compound dissolved in water. As the concentration of hydrogen sulfide increases in the water, the water reaches saturation and any additional hydrogen sulfide will be emitted as gas. Also, at the point of flashing the hot brine, $H_2S$ solubility decreases due cooling and pressure drop, thus escaping to the atmosphere. Hydrogen sulfide as a gas is harmful to the environment and must therefore be abated to acceptable limits.

BRIEF SUMMARY

The present disclosure generally relates to methods and compositions for the abatement of hydrogen sulfide. In one embodiment, a method of reducing hydrogen sulfide content in a medium is disclosed. The method may comprise the steps of contacting a medium containing hydrogen sulfide with an effective amount of hydrogen peroxide, contacting the medium with an oxidizing agent, converting the hydrogen sulfide to water soluble sulfate and/or sulfite, and thereby reducing the hydrogen sulfide content in the medium.

In another embodiment, a method of reducing hydrogen sulfide content in a condensate stream is disclosed. The method may comprise the steps of transporting steam comprising hydrogen sulfide to a condenser, condensing the steam to form a condensate stream, injecting the condensate stream into a reaction tank, sparging air from an air blower into the reaction tank, injecting an effective amount of an oxidizing agent into the reaction tank, injecting an effective amount of hydrogen peroxide into the reaction tank, forming a treated condensate stream by converting the hydrogen sulfide to water soluble sulfate and/or sulfite, and transporting the treated condensate stream into a cooling tower basin.

In an additional embodiment, a method of reducing hydrogen sulfide content in a non-condensable gas (NCG) is provided. The method may comprise the steps of providing a NCG comprising hydrogen sulfide, bubbling the NCG into a cooling tower through a plurality of fine air bubble diffusers disposed on a bottom surface of the cooling tower, wherein the cooling tower comprises water, injecting an effective amount of an oxidizing agent into the cooling tower, dissolving the gas comprising hydrogen sulfide into the water in the cooling tower, reacting the hydrogen sulfide with oxygen and the oxidizing agent in the water, and converting the hydrogen sulfide to water soluble sulfate and/or sulfite, thereby reducing the hydrogen sulfide content in the NCG.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

BRIEF DESCRIPTION OF THE SEVERAL VIEWS OF THE DRAWINGS

A detailed description of the invention is hereafter described with specific reference being made to the drawings in which:

FIG. 1 shows an example of components that may be used in a geothermal power plant as well as a flow diagram for $H_2S$ abatement.

DETAILED DESCRIPTION

Various embodiments are described below with reference to the drawing in which like elements generally are referred to by like numerals. The relationship and functioning of the various elements of the embodiments may better be understood by reference to the following detailed description. However, embodiments are not limited to those illustrated in the drawing. It should be understood that the drawing is not necessarily to scale, and in certain instances details may have been omitted that are not necessary for an understanding of embodiments disclosed herein, such as—for example—conventional fabrication and assembly.

Geothermal power plants may be used to convert the earth's heat into electricity. A geothermal process makes use of the water and sediments beneath the earth's surface. Specifically, magma from earth's core rises and meets the water-rich sediments, thereby heating the water. As the water is heated, it dissolves minerals and thereby forms a brine. The mineral-rich brine may then be cleaned and become a useable resource for energy generation. However, as will be further explained below, the brine contains impurities, such as hydrogen sulfide, that need to be controlled.

With respect to FIG. 1, production wells (1) may be drilled into the earth to tap into the reservoirs to supply a power plant with steam and injection wells may be drilled into the earth to tap into the reservoirs to recharge the reservoir with cooled, geothermal brine.

In a more detailed aspect, the brine is transported from the reservoir within the earth to the surface. It flows through the well to the well head where it is then directed to a high pressure brine separator (2) in the power plant. The high pressure brine separator separates steam from the brine. Steam flows out of the brine separator to the steam scrubber (3). Steam may contain natural impurities, such as minerals, NCG, and condensate. Impurities must be removed as they can be harmful to the power generation equipment and/or the environment. A steam scrubber may be used to wash the water and the minerals from the steam. Clean steam then flows to the steam turbine/generator set(s) (4), which creates electrical energy.

The brine may flow to a standard pressure crystallizer (5), then to a scrubber (6), to be cleaned and create additional steam for the turbine. Brine remaining in the standard pressure crystallizer may be taken through a final stage of steam separation to create low pressure steam that may be transported to a clarifier tank to remove silica, for example, from the brine. The cleaned brine may then flow to one or more injection wells and be injected back into the underground reservoir to be reheated and repressurized by the energy of the earth.

As impurities such as hydrogen sulfide are initially contained in the brine downhole, the impurities are carried with the brine to the surface and through the process described above, unless they are controlled. In some aspects, the treatment of the present disclosure may be used in connection with a condensing-type steam turbine unit. The brine/steam from the reservoir may be transported to the well head, where it may be flashed and separated in a high pressure brine separator. The steam can be sent to the turbine for power generation and the resulting exhaust may be passed through a condenser (7), which comprises a gas extraction system (8), whereby the exhaust steam is cooled and collapses, thereby forming a NCG stream (comprising the gasses that do not condense) and a condensate stream.

The NCG are extracted by the gas extraction system and bubbled into a cooling tower basin (9). In some aspects, the only exhaust being emitted to the atmosphere comes from the cooling tower basin. As noted above, both the condensate stream and the NCG stream may contain hydrogen sulfide, which, according to environmental and health standards, needs to be controlled.

The present disclosure is intended to cover the treatment of hydrogen sulfide not only in steam and brine, but in any fluid, such as any geothermal production fluid, and is not limited to treatment of steam/fluid from the turbine.

In certain embodiments of the present disclosure, the hydrogen sulfide treatment approach may be described as a "dual approach." The dual approach treatment may be used to remove hydrogen sulfide from the brine, the NCG, the condensate, or any combination thereof. The treatment may comprise the use of a combination of air, hydrogen peroxide, and oxidizing agents to convert the hydrogen sulfide to sulfate and/or sulfite, which is a water soluble compound posing no harm to the environment.

With respect to the treatment of the condensate containing hydrogen sulfide, the condensate from the condenser/turbine may be sent through a conduit to a large reaction tank (10) for treatment. An air blower (11) may be in communication with the reaction tank and the air produced from the blower may be sparged into the reaction tank through fine bubbling air diffusers that saturate the condensate fluid with oxygen at a concentration from about 5 ppm about 15 ppm. In some aspects, the oxygen concentration may be about 8 ppm.

In certain embodiments, the condensate may be treated with one or more chemicals before entering the reaction tank, while entering the reaction tank, or just after entering the reaction tank. Specifically, there may be an inlet disposed on the reaction tank and one or more chemical injection pumps may be in fluid communication with the inlet. The chemical injection pump(s) may pump various chemicals into the inlet, such as peroxides (12) and other oxidizing agents (13). The condensate also enters the reaction tank at an inlet, which, in some embodiments, may be the same inlet where the peroxides and oxidizing agents enter or it may be a different inlet located near or next to the peroxide and oxidizing agent inlet. Upon injection of the chemicals into the reaction tank, the condensate comes into contact with, and is thereby treated by, the chemicals, such as one or more oxidizing agents and/or peroxide.

The oxidizing agents may be selected from the group consisting of trichloroisocyanuric acid, chlorine, bromine, mixtures comprising various amounts of chlorine and bromine, and any combination thereof. Additional oxidizing agents that may be used in accordance with the present disclosure include paraacetic acid, ozone, chlorine gas, chlorine dioxide, chlorite, chlorate (instu generation of $ClO_2$), hypochorite, permanganate, perborate, periodate, idodine, fluorine and other halogens and halites, peroxysulfuric acid, transition metal oxides, dibromopropionamide (DBNPA). In one aspect, the oxidizing agent is a granular agent comprising bromine and chlorine. In another embodiment, the oxidizing agent is a tablet comprising bromine and chlorine.

As disclosed herein, any oxidizing agent comprising a mixture of chlorine and bromine can comprise the chlorine and bromine in any ratio. For example, in one aspect, the oxidizing agent may comprise about 60% to about 85% available halogen with approximately 5% to 10% being bromine and approximately 85% to about 95% being chlorine.

The oxidizing agent may serve as a catalyst in the reaction to convert the hydrogen sulfide to sulfate. In some embodiments, the oxidizing agent may be used at a concentration from about 5 ppm to about 25 ppm. In certain embodiments, the oxidizing agent may be used at a concentration from about 10 ppm to about 15 ppm.

The condensate may also be treated with hydrogen peroxide before entering the reaction tank, while entering the reaction tank, or just after it has entered the reaction tank. Hydrogen peroxide may be used to increase the oxygen level in the tank and may be used at concentrations from about 25 ppm to about 75 ppm. In some embodiments, hydrogen peroxide is used at a concentration from about 40 ppm to about 50 ppm.

In some embodiments, after treatment with the oxidizing agent and hydrogen peroxide, the treated condensate from the reaction tank may overflow into a cooling tower basin to complete the abatement treatment process of any remaining unreacted hydrogen sulfide.

With respect to treatment of the NCG stream, the NCG stream may be transported through a conduit from the gas extraction system to the cooling tower basin through a plurality of fine air bubble diffusers that are distributed along the bottom of the cooling tower basin. The bottom of the cooling tower basin may comprise any number of fine air bubble diffusers, such as from about 1 to about 2,000. In some aspects, the bottom of the cooling tower basin may comprise about 1,000 fine air bubble diffusers. In accordance with certain embodiments, the gases being dispersed into small bubbles may be critical for the hydrogen sulfide reaction. The cooling tower water is saturated with oxygen through the normal circulation of the cooling tower fluid.

In some embodiments, an oxidizing agent is added to the cooling tower basin and may act as a catalyst in the conversion reaction of hydrogen sulfide to sulfate. The oxidizing agent may be selected from the group consisting of trichloroisocyanuric acid, chlorine, bromine, mixtures comprising various amounts of chlorine and bromine, and any combination thereof. Additional oxidizing agents that may be used in accordance with the present disclosure include paraacetic acid, ozone, chlorine gas, chlorine dioxide, chlorite, chlorate (instu generation of $ClO_2$), hypochorite, permanganate, perborate, periodate, idodine, fluorine and other halogens and halites, peroxysulfuric acid, transition metal oxides, dibromopropionamide (DBNPA). In one aspect, the oxidizing agent is a granular agent comprising bromine and chlorine. In another embodiment, the oxidizing agent is a tablet comprising bromine and chlorine.

In some embodiments, the oxidizing agent may be used at a concentration from about 5 ppm to about 40 ppm. In certain embodiments, the oxidizing agent may be used at a concentration from about 10 ppm to about 30 ppm.

The hydrogen sulfide gas in the NCG is dissolved into the cooling tower basin water and reacts with both the dissolved oxygen and the oxidizing agent in the water to convert the hydrogen sulfide to sulfate. In some embodiments, hydrogen peroxide may also be added to the cooling tower basin in the amounts disclosed herein.

In accordance with all embodiments disclosed in the present application, injection of chemicals, such as oxidizing agents and peroxides, and injection of streams, such as condensate streams and NCG streams, may be carried out using manual injection or automated injection.

For example, the hydrogen sulfide content of a NCG stream, a condensate stream, or the liquid in the reaction tank may be monitored and controlled or the amount of oxidizing agent and/or peroxide, for example, in the reaction tank, may be monitored and controlled. In certain aspects, the system may include a monitoring and controlling unit that comprises a controller device and a plurality of sensors. Each of the plurality of sensors may be configured to obtain a different characteristic of the fluids/steam and each sensor may be in communication with the controller.

Based on signals received from the sensors, the controller may send signals to the one or more chemical injection pumps, which are in fluid communication with various chemicals, such as oxidizing agents, peroxides, and, in some embodiments, they may be in communication with streams that are entering the reaction tank, for example. The signals may turn the pumps off (cause them to stop adding chemical) or turn the pumps on (cause them to add a specified amount of more chemical). The components of this automated system may be in communication with each other in any number of ways, including, as illustrative examples, through any combination of wired connection, a wireless connection, electronically, cellularly, through infrared, satellite, or according to any other types of communication networks, topologies, protocols, and standards.

As used herein, the term "controller" or "controller device" refers to a manual operator or an electronic device having components such as a processor, memory device, digital storage medium, a communication interface including communication circuitry operable to support communications across any number of communication protocols and/or networks, a user interface (e.g., a graphical user interface that may include cathode ray tube, liquid crystal display, plasma display, touch screen, or other monitor), and/or other components. The controller is preferably operable for integration with one or more application-specific integrated circuits, programs, computer-executable instructions or algorithms, one or more hard-wired devices, wireless devices, and/or one or more mechanical devices. Moreover, the controller is operable to integrate the feedback, feed-forward, or predictive loop(s) of the invention. Some or all of the controller system functions may be at a central location, such as a network server, for communication over a local area network, wide area network, wireless network, internet connection, microwave link, infrared link, wired network (e.g., Ethernet) and the like. In addition, other components such as a signal conditioner or system monitor may be included to facilitate signal transmission and signal-processing algorithms.

The disclosed monitoring and controlling system provides methods to generate real-time, on-line, reliable data from the steam/fluids. Based upon the data received by the controller from the plurality of sensors, real-time adjustments can be made to the system. For example, the plurality of sensors may provide continuous or intermittent feedback, feed-forward, or predictive information to the controller, which can relay this information to a relay device, such as the Nalco Global Gateway, which can transmit the information via cellular communications to a remote device, such as a cellular telephone, computer, or any other device that can receive cellular communications. This remote device can interpret the information and automatically send a signal (e.g. electronic instructions) back, through the relay device, to the controller to cause the controller to make certain adjustments to the output of the chemical injection pumps. The information may also be processed internally by the controller and the controller can automatically send signals to the pumps, to adjust the amount of chemical injection. Based upon the information received by the controller from the plurality of sensors or from the remote device, the controller can transmit signals to the various pumps to make automatic, real-time adjustments, to the amount of chemical that the pumps are injecting into the reaction tank, for example.

In certain aspects, the remote device or controller can include appropriate software to receive data from the plurality of sensors and determine if the data indicates that one or more measured properties, such as hydrogen sulfide content, are within, or outside, an acceptable range. The software can also allow the controller or remote device to determine appropriate actions that should be taken to remedy the property that is outside of the acceptable range. The monitoring and controlling system and/or controller disclosed herein can incorporate programming logic to convert analyzer signals from the plurality of sensors to pump adjustment logic and, in certain embodiments, control one or more of a plurality of chemical injection pumps with a unique basis.

In some embodiments, the oxidation-reduction potential (ORP) may be measured by one or more sensors and the oxidant dose can be automatically controlled based on the ORP. As such, if the ORP is measured above a threshold value or below a threshold value, this could trigger the chemical injection pump to add more oxidant or stop adding oxidant. On-line monitoring of $H_2S$ levels and/or oxidant levels can also automatically cause the chemical injection pumps to add more oxidant or stop adding oxidant.

Data transmission of measured properties or signals to chemical pumps, alarms, remote monitoring devices, such as computers or cellular telephones, or other system components is accomplished using any suitable device, and across any number of wired and/or wireless networks, including as illustrative examples, WiFi, WiMAX, Ethernet, cable, digital subscriber line, Bluetooth, cellular technologies (e.g., 2G, 3G, Universal Mobile Telecommunications System (UMTS), GSM, Long Term Evolution (LTE), or more) etc. The Nalco Global Gateway is an example of a suitable device. Any suitable interface standard(s), such as an Ethernet interface, wireless interface (e.g., IEEE 802.11a/b/g/x, 802.16, Bluetooth, optical, infrared, radiofrequency, etc.), universal serial bus, telephone network, the like, and combinations of such interfaces/connections may be used. As used herein, the term "network" encompasses all of these data transmission methods. Any of the described devices (e.g., archiving systems, data analysis stations, data capturing devices, process devices, remote monitoring devices, chemical injection pumps, etc.) may be connected to one another using the above-described or other suitable interface or connection.

Various additional automated methods that can be used in accordance with the present disclosure for monitoring and controlling industrial systems are disclosed in U.S. Pat. No. 8,303,768, U.S. Patent Application Publication No. 2013/0161265, U.S. Patent Application Publication No. 2013/0233804, U.S. Patent Application Publication No. 2013/0233796, and U.S. Ser. No. 13/833,115, the contents of each of these documents being incorporated by reference into the present application in their entirety.

In accordance with the foregoing, it can be seen that hydrogen sulfide that has evolved during the geothermal process into the NCG and condensate may be properly treated through the use of air, one or more oxidizing agents, and hydrogen peroxide to achieve hydrogen sulfide conversion to sulfate. In accordance with the present disclosure, the overall abatement reduction in hydrogen sulfide emissions to the environment is greater than 95%.

While the presently disclosed hydrogen sulfide treatment methods have been disclosed in connection with geothermal power plants, it is envisioned that the treatment methods may be used in any industrial setting where abatement of hydrogen sulfide is desired, such as in oil and gas refineries. Therefore, the present treatment methods are applicable to all mediums that contain hydrogen sulfide.

For example, in one aspect, the present disclosure is directed to a method of reducing hydrogen sulfide content in a medium. The method may comprise the steps of contacting the medium containing hydrogen sulfide with an effective amount of hydrogen peroxide, contacting the medium with an oxidizing agent, converting the hydrogen sulfide to sulfate, and thereby reducing the hydrogen sulfide content in the medium.

In accordance with certain embodiments, the medium may be a liquid or a gas. For example, the gas may be steam or NCG and the liquid may be a condensate stream. In some embodiments, the medium is a liquid and an effective amount of oxygen is added to the liquid.

In certain embodiments, the method may further comprise the steps of injecting the medium into a reaction tank. The reaction tank may comprise a liquid, such as water, and hydrogen peroxide, one or more oxidizing agents, and/or air may be added to the water.

As an additional example, the presently disclosed treatment program may be used in a method for reducing hydrogen sulfide content in a condensate stream. The method may include the one or more steps selected from transporting steam comprising hydrogen sulfide to a condenser, condensing the steam to form a condensate stream, injecting the condensate stream into a reaction tank, sparging air from an air blower into the reaction tank, injecting an effective amount of an oxidizing agent into the reaction tank, injecting an effective amount of hydrogen peroxide into the reaction tank, forming a treated condensate by converting the hydrogen sulfide to sulfate, and transporting the treated condensate stream into a cooling tower basin.

The reaction tank may comprise a liquid medium, such as water. The oxidizing agent may be any oxidizing agent, or combination of oxidizing agents, disclosed in the present application. Further, the effective amount of the oxidizing agent and the effective amount of the hydrogen peroxide may be any of the effective amounts disclosed herein.

In a further illustrative example, the presently disclosed treatment program may be used in a method for reducing hydrogen sulfide content in a NCG. The method may include any or all steps selected from providing a NCG comprising hydrogen sulfide, bubbling the NCG into a cooling tower through a plurality of fine air bubble diffusers disposed on a bottom surface of the cooling tower, wherein the cooling tower comprises water, injecting an effective amount of an oxidizing agent into the cooling tower, dissolving the gas comprising hydrogen sulfide into the water in the cooling tower, reacting the hydrogen sulfide with oxygen and the oxidizing agent in the water, and converting the hydrogen sulfide to sulfate, thereby reducing the hydrogen sulfide content in the NCG. The method may also comprise the step of saturating the water with oxygen, which, in some aspects, can be accomplished with an air blower or, in other aspects, the water may be saturated with oxygen through normal circulation in the cooling tower.

The oxidizing agent may be any oxidizing agent, or combination of oxidizing agents, disclosed in the present application. Further, the effective amount of the oxidizing agent may be any of the effective amounts disclosed herein.

EXAMPLES

Testing was carried out in the field in an operational geothermal power plant to validate the treatment scheme disclosed in the present application. The amount of hydrogen sulfide coming into the plant was measured in addition to the amount of hydrogen sulfide leaving the plant. Various measurements were also taken in between the entry and exit points. Any hydrogen sulfide meter known in the art may be used to carry out these measurements.

The column headings in Table 1 "NCG Value" and "Condensate" show the amount of hydrogen sulfide in the condensate and NCG streams at the inlet of the reaction tank before treatment. The "Reaction Tank" column shows hydrogen sulfide concentration in the reaction tank, after treatment with hydrogen peroxide and an oxidizing agent comprising bromine and chlorine in either a granular or tablet form (the granular or tablet form includes about 62% to about 85% available halogen, with about 7% bromine and about 93% chlorine). The "Shroud" column shows hydrogen sulfide concentration in the exhaust gas leaving the system. Comparing the amount of hydrogen sulfide in the exhaust gas to the amount of hydrogen sulfide in the NCG and condensate, it can be seen that the presently disclosed treatment can abate over 95% of the hydrogen sulfide (generally about 100 pounds coming in and 1 pound leaving).

TABLE 1

H2S ABATEMENT DATA

| | NCG VALUE | | CONDENSATE | | REACTION TANK | SHROUD | OVERALL H2S EMISSIONS LBS/HR Limit 3.8 lbs/ | |
| --- | --- | --- | --- | --- | --- | --- | --- | --- |
| DATE | PPM | LBS/HR | PPM | LBS/HR | PPM | PPM | hr | % Abatement |
| *Apr. 2, 2012 | 6213 | 44.7 | 47.4 | 31.1 | 17.3 | 0.04 | 1.54 | 97.97% |
| *Apr. 9, 2012 | 6213 | 44.6 | 46.7 | 30.7 | 18.5 | 0.04 | 1.54 | 97.96% |
| *Apr. 17, 2012 | 6236 | 44.4 | 44.2 | 28.4 | 16.7 | 0.04 | 1.54 | 97.89% |
| *Apr. 23, 2012 | 6273 | 44.4 | 44.7 | 28.8 | 18.3 | 0.04 | 1.54 | 97.90% |
| *May 4, 2012 | 486 | 3.37 | 47.4 | 34.1 | 19.8 | <0.005 | 0.16 | 99.57% |
| May 8, 2012 | 6188 | 40.7 | 44.0 | 28.5 | 18.6 | <0.005 | 0.16 | 99.77% |
| *May 14, 2012 | 2186 | 15.5 | 51.1 | 33.5 | 17.6 | <0.005 | 0.16 | 99.67% |
| May 21, 2012 | 5963 | 41.0 | 41.8 | 29.8 | 17.2 | 0.02 | 0.59 | 99.17% |
| May 28, 2012 | 5612 | 37.6 | 41.8 | 28.2 | 14.5 | 0.01 | 0.27 | 99.59% |
| Jun. 4, 2012 | 5870 | 38.3 | 41.8 | 30.1 | 16.2 | 0.01 | 0.34 | 99.50% |
| Jun. 11, 2012 | 5349 | 36.1 | 43.6 | 31.1 | 14.7 | 0.02 | 0.57 | 99.15% |
| Jun. 18, 2012 | 5764 | 38.8 | 42.0 | 29.8 | 15.3 | 0.05 | 1.91 | 97.22% |
| Jun. 25, 2012 | 5685 | 37.1 | 42.4 | 30.5 | 16.3 | 0.04 | 1.42 | 97.90% |
| Jul. 2, 2012 | 5560 | 35.9 | 42.4 | 30.7 | 17.4 | 0.01 | 0.59 | 99.11% |
| Jul. 9, 2012 | 5771 | 36.8 | 40.3 | 29.5 | 15.3 | 0.02 | 0.74 | 98.88% |
| Jul. 16, 2012 | 5838 | 37.0 | 40.9 | 29.1 | 15.3 | 0.01 | 0.46 | 99.30% |
| Jul. 23, 2012 | 5951 | 38.0 | 40.4 | 29.7 | 15.3 | 0.02 | 0.69 | 98.98% |
| Jul. 30, 2012 | 6043 | 38.6 | 40.2 | 29.7 | 12.7 | 0.01 | 0.23 | 99.66% |
| Aug. 9, 2012 | 5517 | 31.7 | 37.7 | 28.1 | 13.3 | 0.02 | 0.85 | 98.58% |
| Aug. 14, 2012 | 5796 | 35.7 | 34.9 | 26.0 | 9.91 | 0.03 | 1.25 | 97.97% |
| Aug. 21, 2012 | 6062 | 36.7 | 36.4 | 26.9 | 12.0 | 0.03 | 1.06 | 98.33% |
| Aug. 27, 2012 | 6348 | 38.0 | 37.7 | 26.8 | 11.3 | 0.07 | 2.21 | 96.59% |
| Sep. 4, 2012 | 5832 | 34.4 | 35.3 | 25.3 | 11.3 | 0.02 | 0.93 | 98.44% |
| Sep. 10, 2012 | 6000 | 35.4 | 36.1 | 27.1 | 12.5 | 0.03 | 1.22 | 98.05% |
| Sep. 17, 2012 | 6047 | 35.2 | 35.0 | 25.1 | 11.9 | 0.07 | 2.64 | 95.62% |
| Sep. 24, 2012 | 6197 | 36.7 | 35.6 | 26.8 | 10.99 | 0.01 | 0.33 | 99.48% |
| Oct. 1, 2012 | 6155 | 31.4 | 36.9 | 27.6 | 33.0 | 0.02 | 0.93 | 98.42% |
| Oct. 8, 2012 | 6497 | 38.5 | 38.0 | 28.3 | 12.4 | 0.06 | 2.23 | 96.66% |
| Oct. 15, 2012 | 6007 | 35.9 | 35.2 | 24.6 | 9.00 | 0.07 | 2.45 | 95.95% |
| Oct. 22, 2012 | 5871 | 27.9 | 38.8 | 27.9 | 12.6 | 0.07 | 2.07 | 96.29% |
| Oct. 29, 2012 | 6676 | 37.7 | 37.2 | 25.5 | 11.7 | 0.07 | 2.04 | 96.77% |
| Nov. 5, 2012 | 5949 | 33.9 | 39.2 | 27.2 | 11.9 | 0.03 | 1.00 | 98.36% |
| Nov. 12, 2012 | 5947 | 33.2 | 38.2 | 24.3 | 13.6 | 0.01 | 0.29 | 99.50% |
| Nov. 19, 2012 | 5967 | 32.9 | 41.8 | 25.6 | 9.8 | 0.03 | 0.85 | 98.55% |
| Nov. 26, 2012 | 6106 | 34.0 | 41.7 | 26.07 | 12.4 | 0.07 | 2.04 | 96.61% |
| Dec. 3, 2012 | 6390 | 34.6 | 39.3 | 25.3 | 8.91 | 0.08 | 2.86 | 95.22% |
| Dec. 10, 2012 | 5786 | 29.5 | 41.6 | 24.5 | 14.4 | 0.04 | 1.23 | 97.72% |
| Dec. 17, 2012 | 5600 | 30.5 | 41.5 | 24.1 | 13.3 | 0.02 | 0.60 | 98.90% |

TABLE 1-continued

H2S ABATEMENT DATA

| DATE | NCG VALUE | | CONDENSATE | | REACTION TANK | SHROUD | OVERALL H2S EMISSIONS LBS/HR Limit 3.8 lbs/ | |
|---|---|---|---|---|---|---|---|---|
| | PPM | LBS/HR | PPM | LBS/HR | PPM | PPM | hr | % Abatement |
| Dec. 24, 2012 | 5666 | 30.6 | 39.8 | 22.6 | 12.7 | 0.01 | 0.40 | 99.25% |
| Jan. 2, 2013 | 5447 | 29.2 | 43.0 | 25.1 | 14.85 | 0.02 | 0.85 | 98.43% |
| Jan. 7, 2013 | 5271 | 28.9 | 42.4 | 25.9 | 12.32 | 0.03 | 1.22 | 97.77% |
| Jan. 14, 2013 | 5476 | 29.9 | 42.3 | 24.0 | 12.18 | 0.04 | 1.16 | 97.85% |
| Feb. 25, 2013 | 4920 | 28.3 | 46.9 | 29.7 | 17.2 | 0.01 | 0.32 | 99.45% |
| Mar. 4, 2012 | 5891 | 34.2 | 36.2 | 23.3 | 10.9 | 0.07 | 2.55 | 95.57% |
| Mar. 11, 2013 | 5242 | 29.6 | 41.8 | 26.6 | 13.2 | 0.06 | 1.84 | 96.72% |
| Mar. 18, 2013 | 5623 | 32.0 | 38.5 | 25.8 | 11.1 | 0.06 | 2.25 | 96.11% |
| Mar. 25, 2013 | 5628 | 31.8 | 38.4 | 25.2 | 12.1 | 0.06 | 2.23 | 96.09% |
| Apr. 1, 2013 | 5686 | 32.8 | 36.8 | 23.8 | 11.2 | 0.08 | 2.75 | 95.15% |
| Apr. 8, 2013 | 5403 | 35.1 | 39.9 | 26.7 | 12.5 | 0.05 | 1.46 | 97.64% |
| Apr. 15, 2013 | 5915 | 39.1 | 37.0 | 25.1 | 11.2 | 0.06 | 1.68 | 97.38% |
| Apr. 22, 2013 | 5977 | 40.3 | 36.7 | 26.5 | 11.5 | 0.06 | 1.77 | 97.35% |
| Apr. 29, 2013 | 6096 | 41.6 | 36.5 | 25.3 | 10.6 | 0.06 | 2.29 | 96.57% |
| May 6, 2013 | 6040 | 40.8 | 37.5 | 25.8 | 11.1 | 0.03 | 1.23 | 98.15% |
| May 13, 2013 | 6110 | 42.4 | 35.9 | 25.2 | 10.6 | 0.02 | 0.66 | 99.02% |
| May 20, 2013 | 6091 | 41.2 | 37.1 | 24.7 | 11.7 | 0.01 | 0.46 | 99.30% |
| May 28, 2013 | 5517 | 37.6 | 37.3 | 25.3 | 12.3 | 0.03 | 1.38 | 97.80% |
| Jun. 3, 2013 | 5514 | 37.4 | 35.3 | 24.1 | 10.8 | 0.02 | 0.78 | 98.73% |
| Jun. 10, 2013 | 6026 | 41.3 | 34.0 | 23.4 | 10.3 | 0.01 | 0.29 | 99.55% |
| Jun. 17, 2013 | 5862 | 39.2 | 35.9 | 26.3 | 11.2 | 0.03 | 1.31 | 98.00% |
| Jun. 24, 2013 | 6128 | 40.8 | 33.4 | 24.6 | 11.6 | 0.02 | 0.69 | 98.94% |
| Jul. 1, 2013 | 5883 | 40.2 | 34.0 | 23.8 | 9.5 | 0.02 | 0.84 | 98.69% |
| Jul. 8, 2013 | 5899 | 40.1 | 35.5 | 24.4 | 8.8 | 0.02 | 0.78 | 98.79% |
| Jul. 15, 2013 | 5799 | 39.6 | 35.2 | 23.7 | 10.5 | 0.01 | 0.55 | 99.13% |
| Jul. 22, 2013 | 6079 | 41.3 | 32.2 | 22.6 | 9.6 | 0.03 | 1.45 | 97.73% |
| Jul. 29, 2013 | 5956 | 35.4 | 36.1 | 24.9 | 11.2 | 0.04 | 1.84 | 96.95% |
| Aug. 5, 2013 | 6103 | 40.3 | 35.5 | 24.7 | 10.6 | 0.01 | 0.32 | 99.51% |
| Aug. 12, 2013 | 6252 | 40.3 | 37.0 | 26.0 | 10.5 | 0.01 | 0.25 | 99.62% |
| Aug. 19, 2013 | 6148 | 37.9 | 31.5 | 22.6 | 8.5 | 0.01 | 0.40 | 99.34% |
| Aug. 26, 2013 | 6047 | 38.3 | 31.5 | 22.63 | 8.2 | 0.003 | 0.16 | 99.74% |
| Sep. 3, 2013 | 6176 | 41.5 | 31.6 | 22.6 | 9.8 | 0.01 | 0.36 | 99.44% |
| Sep. 9, 2013 | 6375 | 44.8 | 30.9 | 21.9 | 7.7 | 0.02 | 0.79 | 98.82% |
| Sep. 18, 2013 | 6177 | 39.8 | 34.6 | 23.7 | 10.4 | 0.01 | 0.61 | 99.04% |
| Sep. 23, 2013 | 6371 | 41.0 | 31.8 | 21.4 | 10.1 | 0.01 | 0.57 | 99.09% |
| Sep. 30, 2013 | 6122 | 37.9 | 34.4 | 23.2 | 9.3 | 0.01 | 0.23 | 99.62% |
| Oct. 7, 2013 | 6017 | 39.0 | 35.9 | 24.2 | 10.4 | 0.01 | 0.56 | 99.11% |
| Oct. 21, 2013 | 5558 | 34.9 | 35.3 | 22.9 | 10.8 | 0.01 | 0.47 | 99.19% |
| Oct. 28, 2013 | 5578 | 34.2 | 37.0 | 24.3 | 12.2 | 0.03 | 1.13 | 98.07% |
| Nov. 4, 2013 | 5719 | 35.3 | 36.6 | 23.0 | 10.2 | 0.02 | 0.61 | 98.95% |
| Nov. 11, 2013 | 5605 | 33.9 | 37.6 | 24.0 | 11.3 | 0.01 | 0.20 | 99.65% |
| Nov. 18, 2013 | 6078 | 35.2 | 36.6 | 23.7 | 10.7 | 0.01 | 0.30 | 99.49% |
| Nov. 25, 2013 | 5514 | 31.3 | 37.8 | 22.7 | 11.1 | 0.008 | 0.28 | 99.48% |
| Dec. 2, 2013 | 5531 | 33.3 | 36.6 | 23.66 | 9.46 | 0.018 | 0.60 | 98.95% |
| Dec. 9, 2013 | 5124 | 30.0 | 38.5 | 23.2 | 12.0 | 0.01 | 0.36 | 99.32% |
| Dec. 16, 2013 | 5616 | 32.9 | 37.2 | 23.3 | 12.1 | 0.005 | 0.17 | 99.70% |
| Dec. 23, 2013 | 5422 | 29.8 | 36.1 | 21.2 | 11.5 | 0.004 | 0.15 | 99.71% |
| Dec. 30, 2013 | 6402 | 35.9 | 37.3 | 22.5 | 11.4 | 0.03 | 1.05 | 98.20% |
| Jan. 6, 2014 | 5919 | 33.5 | 38.5 | 22.7 | 12.48 | 0.02 | 0.66 | 98.83% |
| Jan. 13, 2014 | 5415 | 31.2 | 35.0 | 21.6 | 12.16 | 0.01 | 0.40 | 99.24% |
| Jan. 20, 2014 | 4969 | 27.7 | 35.4 | 21.4 | 12.90 | 0.02 | 0.56 | 98.86% |
| Jan. 27, 2014 | 4962 | 28.5 | 40.8 | 26.0 | 15.60 | 0.02 | 0.69 | 98.73% |
| Feb. 5, 2014 | 5180 | 28.9 | 39.4 | 22.4 | 11.21 | 0.01 | 0.22 | 99.57% |
| Feb. 17, 2014 | 5202 | 28.8 | 40.0 | 25.7 | 13.49 | 0.01 | 0.52 | 99.05% |
| Feb. 24, 2014 | 5124 | 29.4 | 39.9 | 25.6 | 11.15 | 0.07 | 2.89 | 94.74% |
| Mar. 3, 2014 | 5550 | 31.7 | 37.1 | 23.1 | 11.67 | 0.03 | 0.92 | 98.32% |
| Mar. 10, 2014 | 5576 | 30.8 | 39.9 | 26.2 | 13.51 | 0.05 | 1.83 | 96.79% |
| Mar. 17, 2014 | 4947 | 29.6 | 37.1 | 24.8 | 12.08 | 0.05 | 1.86 | 96.58% |
| Mar. 24, 2014 | 4846 | 30.2 | 40.0 | 27.1 | 15.09 | 0.05 | 1.88 | 96.71% |
| Mar. 31, 2014 | 5223 | 33.2 | 37.4 | 26.3 | 12.31 | 0.01 | 0.45 | 99.24% |

In Table 1, the "*" symbol indicates an estimated value.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" or "an" is intended to include "at least one" or "one or more." For example, "an oxidizing agent" is intended to include "at least one oxidizing agent" or "one or more oxidizing agents."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges (including all fractional and whole values) subsumed therein.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A method of reducing hydrogen sulfide content in a condensate stream consisting of:
    transporting steam comprising hydrogen sulfide to a condenser,
    condensing the steam to form a condensate stream,
    injecting the condensate stream into a reaction tank,
    sparging air from an air blower into the reaction tank,
    injecting an effective amount of an oxidizing agent into the reaction tank, wherein the oxidizing agent is selected from the group consisting of peracetic acid, chlorine dioxide, chlorite, chlorate, hypochlorite, permanganate, perborate, periodate, iodine, fluorine, peroxysulfuric acid, dibromopropionamide, and any combination thereof,
    injecting an effective amount of hydrogen peroxide into the reaction tank,
    forming a treated condensate stream by converting the hydrogen sulfide to sulfate and/or sulfite, and
    transporting the treated condensate stream into a cooling tower basin.

2. The method of claim 1, wherein the oxidizing agent is selected from the group consisting of permanganate, perborate, periodate, and any combination thereof.

3. The method of claim 1, wherein the oxidizing agent is selected from the group consisting of perborate, periodate, and any combination thereof.

4. The method of claim 1, wherein the oxidizing agent is periodate.

5. The method of claim 1, wherein the reaction tank comprises water.

6. The method of claim 1, wherein the effective amount of oxidizing agent is from about 5 ppm to about 25 ppm.

7. The method of claim 1, wherein the effective amount of hydrogen peroxide is from about 25 ppm to about 75 ppm.

8. A method of reducing hydrogen sulfide content in a non-condensable gas (NCG) consisting of:
    providing a NCG comprising hydrogen sulfide,
    bubbling the NCG into a cooling tower through a plurality of fine air bubble diffusers disposed on a bottom surface of the cooling tower, wherein the cooling tower comprises water,
    injecting an effective amount of an oxidizing agent into the cooling tower,
    dissolving the gas comprising hydrogen sulfide into the water in the cooling tower,
    reacting the hydrogen sulfide with oxygen and the oxidizing agent in the water, and
    converting the hydrogen sulfide to sulfate and/or sulfite, thereby reducing the hydrogen sulfide content in the NCG.

9. The method of claim 1, wherein the effective amount of the oxidizing agent is from about 5 ppm to about 40 ppm.

10. The method of claim 1, wherein the oxidizing agent is selected from the group consisting of trichloroisocyanuric acid, chlorine, bromine, mixtures comprising chlorine and bromine, paraacetic acid, ozone, chlorine gas, chlorine dioxide, chlorite, chlorate, hypochlorite, permanganate, perborate, periodate, iodine, fluorine, halogens, halites, peroxysulfuric acid, transition metal oxides, dibromopropionamide (DBNPA), and any combination thereof.

* * * * *